United States Patent [19]

Mack

[11] Patent Number: 5,573,294
[45] Date of Patent: Nov. 12, 1996

[54] AUTOMOTIVE FLOOR CARPET ARRANGEMENT

[75] Inventor: Kenneth S. Mack, Bloomfield Hills, Mich.

[73] Assignee: Chrysler Corporation, Highland Park, Mich.

[21] Appl. No.: 348,710

[22] Filed: Dec. 2, 1994

Related U.S. Application Data

[63] Continuation of Ser. No. 140,912, Oct. 25, 1993, abandoned.
[51] Int. Cl.$^6$ ................................................. B60N 3/04
[52] U.S. Cl. .......................... 296/97.23; 296/39.1; 16/4
[58] Field of Search ........................... 296/39.1, 39.3, 296/97.23; 16/4, 7

[56] References Cited

U.S. PATENT DOCUMENTS 4,829,627  5/1989  Altus ............................................... 16/4

FOREIGN PATENT DOCUMENTS 3213442  9/1991  Japan ..................................... 296/39.3
4212644  8/1992  Japan .................................... 296/97.23

Primary Examiner—Dennis H. Pedder
Attorney, Agent, or Firm—Christopher A. Taravella

[57] ABSTRACT

There is illustrated and described herein a modular carpet arrangement for use on a vehicle underbody, including a pair of vapor barriers, each with a plurality of projections formed thereon and mountable on opposite sides of the underbody, a longitudinal carpet segment mountable on the center section of the underbody, a pair of longitudinal carpet segments mountable on oppositely disposed longitudinal edges of the underbody, and four reversible carpet segments, each with a plurality of holes formed therein and mountable in fore and aft pairs on the respective vapor barriers, with the holes fitted around the respective projections.

3 Claims, 3 Drawing Sheets

5,573,294

AUTOMOTIVE FLOOR CARPET ARRANGEMENT

This is a continuation, of application Ser. No. 08/140,912, filed on Oct. 25, 1993, now abandoned.

TECHNICAL FIELD

This invention relates generally to automotive floor carpet arrangements and, more particularly, to a modular floor carpet arrangement.

BACKGROUND ART

Anderson U.S. Pat. No. 1,680,442 discloses a floor mat formed of a rubber base including fastener sections for mounting on the floor of an automobile, and a section of natural sheepskin secured to the base, with the wool side thereof facing up to receive or be engaged by the driver's foot.

Altus et al U.S. Pat. No. 4,829,627 discloses a retainer with male fasteners formed on the upper surface thereof and bristles formed on the lower surface thereof for mounting on an automobile floor pan, a carpet for mounting on the retainer, and a heel pad for mounting on the carpet. The carpet and heel pad each have openings formed therein for receiving the male fasteners.

Kuwabara et al U.S. Pat. No. 4,848,826 discloses a carpet laid over a luggage compartment floor of a motor vehicle.

Abstetar U.S. Pat. No. 4,944,612 discloses a bed panel for an open-bodied ,truck bed.

DISCLOSURE OF THE INVENTION

A general object of the invention is to provide an improved vehicle interior carpet arrangement.

Another object of the invention is to provide a modular vehicle carpet arrangement wherein the principle wear portions thereof are reversible.

A further object of the invention is to provide a vehicle carpet arrangement including a pair of vapor barriers and separate center, outer edge and intermediate carpet segments mountable on a vehicle underbody.

Still another object of the invention is to provide a modular carpet arrangement for use on a vehicle underbody having an inverted U-shaped center section between oppositely disposed depressed sections, the carpet arrangement comprising a pair of vapor barriers, each with a plurality of projections formed thereon and mountable in the depressed sections, a longitudinal inverted U-shaped carpet segment mountable on the inverted U-shaped center section, a pair of longitudinal carpet segments mountable on oppositely disposed longitudinal edges of the underbody, and four carpet segments, each with a plurality of holes formed therein and mountable in pairs on the respective vapor barriers, with the holes fitted around the projections.

These and other objects and advantages will become more apparent when reference is made to the following drawings and the accompanying description.

BEST MODE OF CARRYING OUT THE INVENTION

Figure 1:
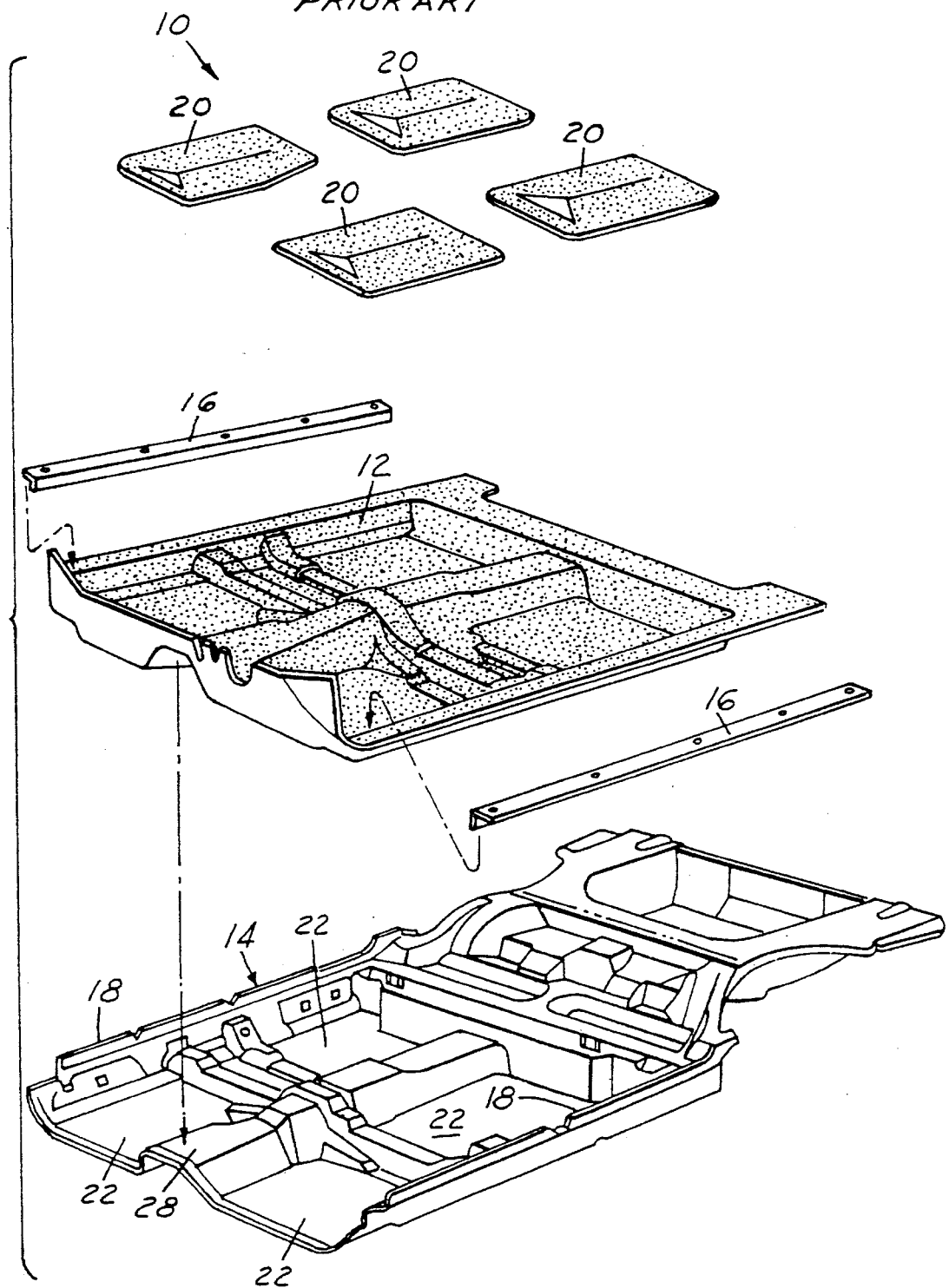
FIG. 1 is an exploded perspective view of a vehicle underbody and a prior art carpet arrangement therefor.
Figure 1A:
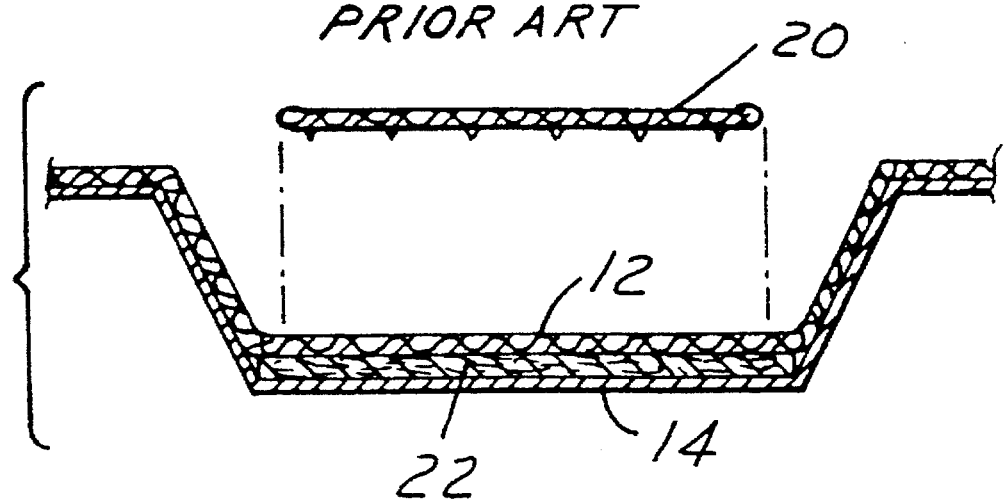
FIG. 1A is an exploded cross-sectional end view of the FIG. 1 components

Referring first to the drawings in greater detail, FIG. 1 illustrates a prior art vehicle carpet arrangement 10, including a contoured carpet 12 which is shaped to match an underbody 14. Typically, oppositely disposed plastic trim bezels 16 are secured along the longitudinal edges 18 of the contoured carpet 12. Mats 20 may be shaped to fit into four depressions 22 formed in the carpet 12 and underbody 14 to accommodate the feet of the operator and front and rear passengers. A sound deadening layer 23 (FIGS. 1A and 2A) may be included in each depression 22.

Figure 2:
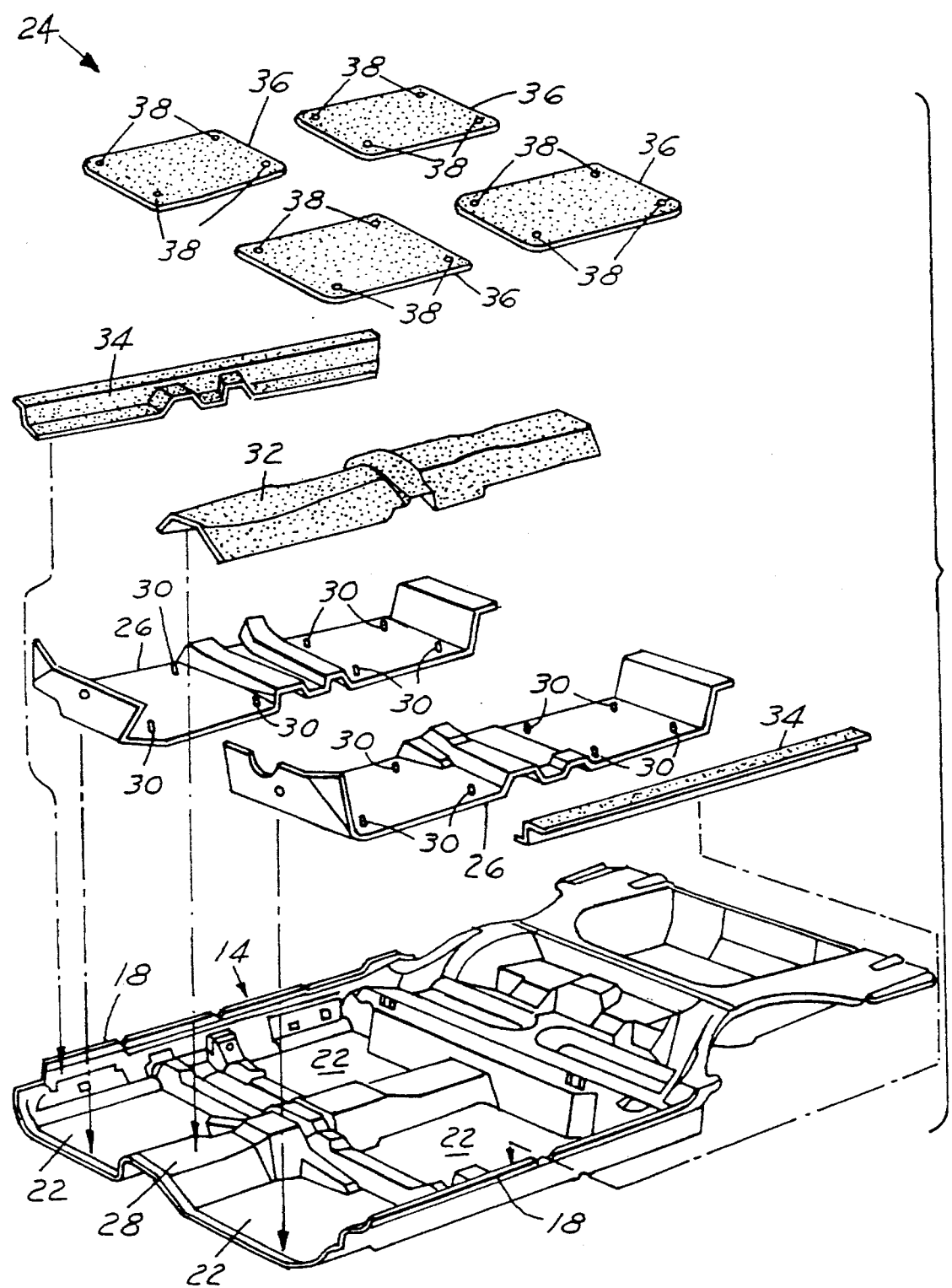
FIG. 2 is an exploded perspective view of the vehicle underbody and the carpet arrangement of the invention.
Figure 2A:
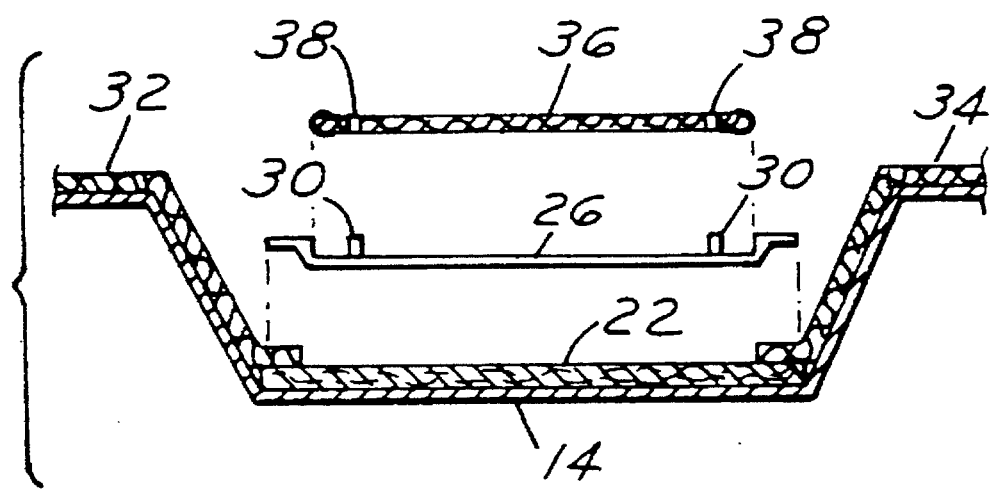
FIG. 2A is an exploded cross-sectional end view of the FIG. 2 components.

Referring now to FIG. 2, there is illustrated a carpet arrangement 24 for use on the underbody 14. However, in keeping with the features of the invention, a pair of formed vapor barriers 26 complete with suitable sound deadening materials, represented as 27, are adapted to fit on opposite sides of a center inverted U-shaped extension 28 of the underbody 14. A laterally extending raised center section 29 is formed on each vapor barrier 26, defining fore and aft depressed sections 29a and 29b. Two sets of four raised carpet-mounting projections 30 are formed in respective front and rear sections 29a and 29b of each vapor barrier 26 adjacent the four corners thereof.

A length of carpet 32 is formed to mount over the center extension 28. A pair of contoured carpet lengths 34, each complete with sound deadening materials represented generally as 35, are formed to mount on the oppositely disposed longitudinal edges of the underbody 14.

Four rectangular reversible carpet segments 36 are shaped to fit directly into the respective four feet depressions 22 in the underbody 14. Each carpet segment 36 has four attaching holes 38 formed adjacent the four corners thereof, adapted to fit over the vapor barrier projections 30, preventing lateral shifting from occurring.

INDUSTRIAL APPLICABILITY

It should be apparent that the vehicle carpet arrangement of the present invention provides a modular carpet system that offers less complexity, more versatility with the reversible mats, and lower manufacturing costs with less carpeted surface area, than for prior carpet arrangements, and lighter weight when compared to a vehicle equipped with accessory mats.

While but one embodiment of the invention has been shown and described, other modifications thereof are possible within the scope of the following claims.

What is claimed is:

1. A modular carpet arrangement for use on a vehicle underbody having an inverted U-shaped center section intermediate oppositely disposed longitudinally aligned pairs of depressed sections, said carpet arrangement comprising a pair of longitudinally extending vapor barriers, each formed to include front and rear sections mountable in said respective aligned pairs of depressed sections, a longitudinal inverted U-shaped carpet segment mountable on the inverted U-shaped center section, a separate longitudinal carpet segment mountable on each of oppositely disposed longitudinal edges of the underbody, and four removable reversible carpet segments mountable in front and rear pairs on said respective front and rear sections of said longitudinally extending vapor barriers over said aligned pairs of depressed sections, and projections formed on each of said front and rear sections of said vapor barriers adjacent the four corners of each depressed section, and holes formed in each of said four removable reversible carpet segments adjacent the corners thereof adapted to fit around the respective projections.

2. The modular carpet arrangement described in claim 1, wherein each vapor barrier includes a laterally extending raised center section defining fore and aft depressed sections.

3. The modular carpet arrangement described in claim 1, wherein said vapor barriers include sound deadening materials.

* * * * *